Dec. 4, 1956  G. T. KUWADA  2,772,562
WATCH BALANCE SPRING TESTING DEVICE
Filed Oct. 15, 1953  3 Sheets-Sheet 2
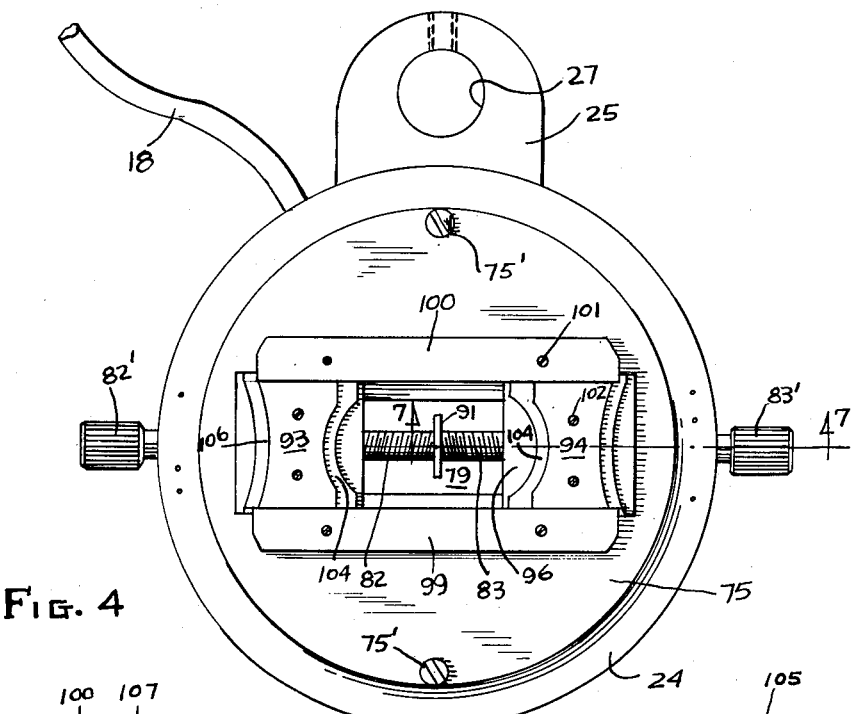
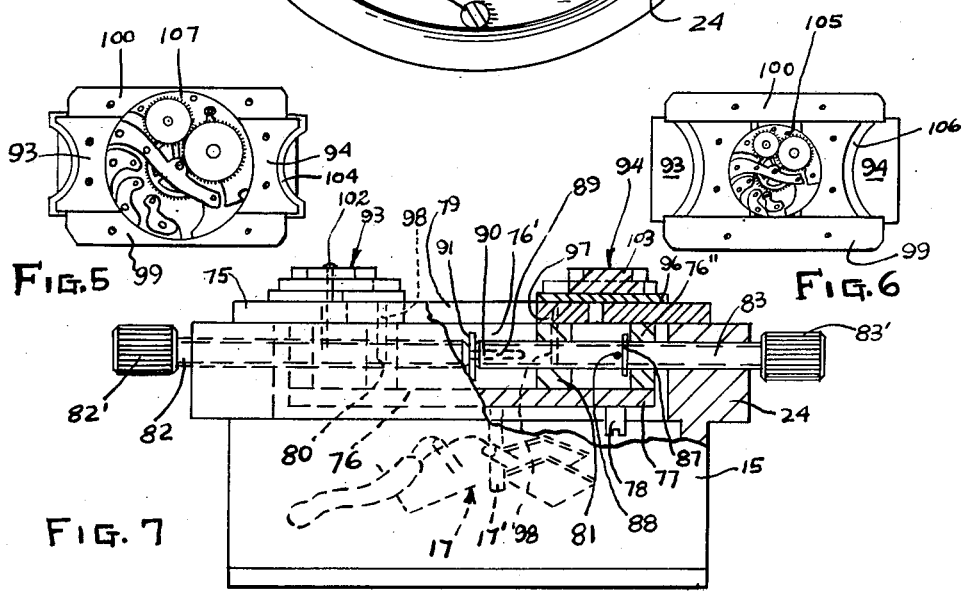
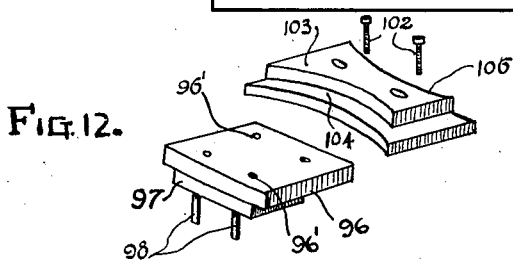
INVENTOR.
GEORGE T. KUWADA
BY
*L. S. Saulsbury*
ATTORNEY

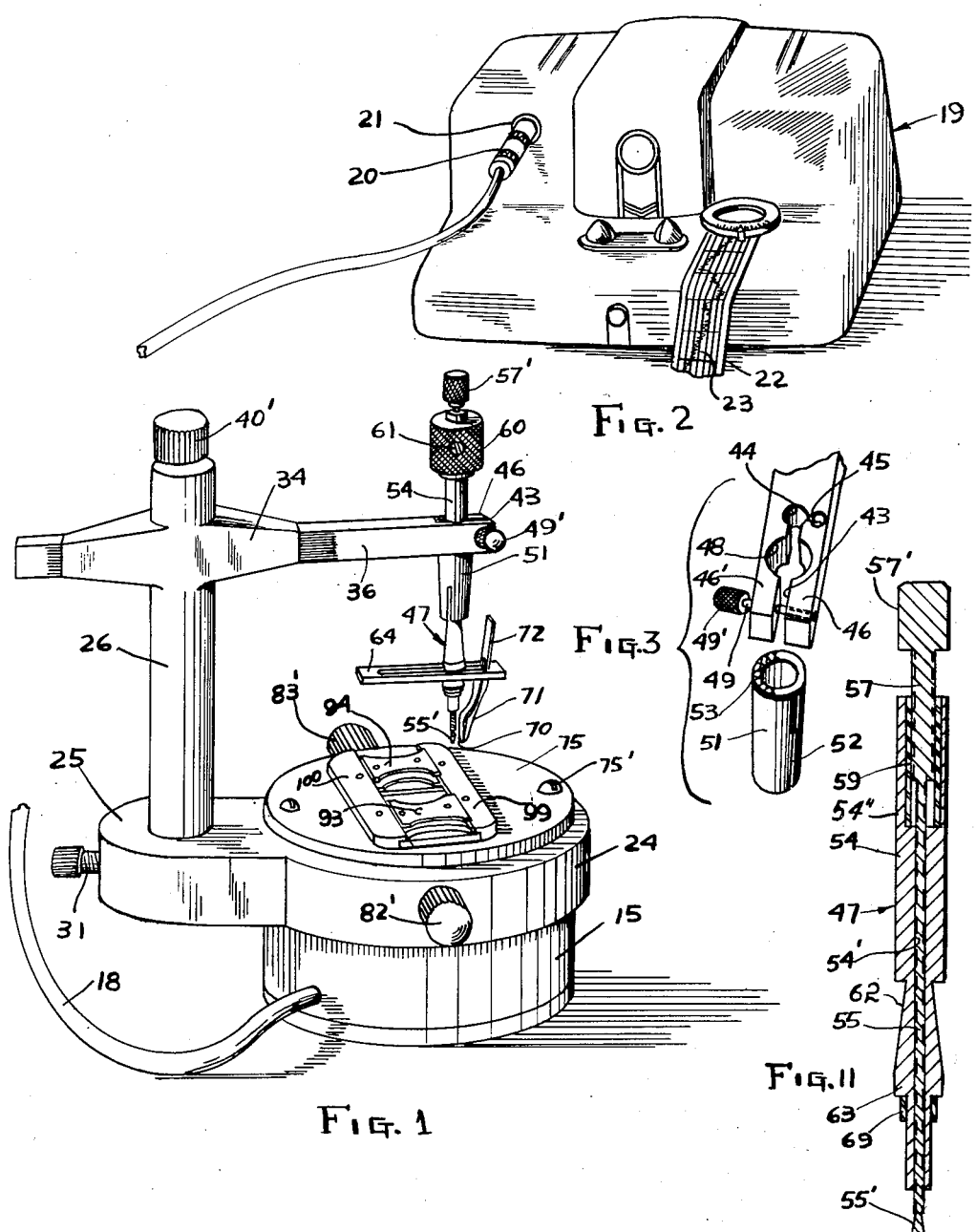

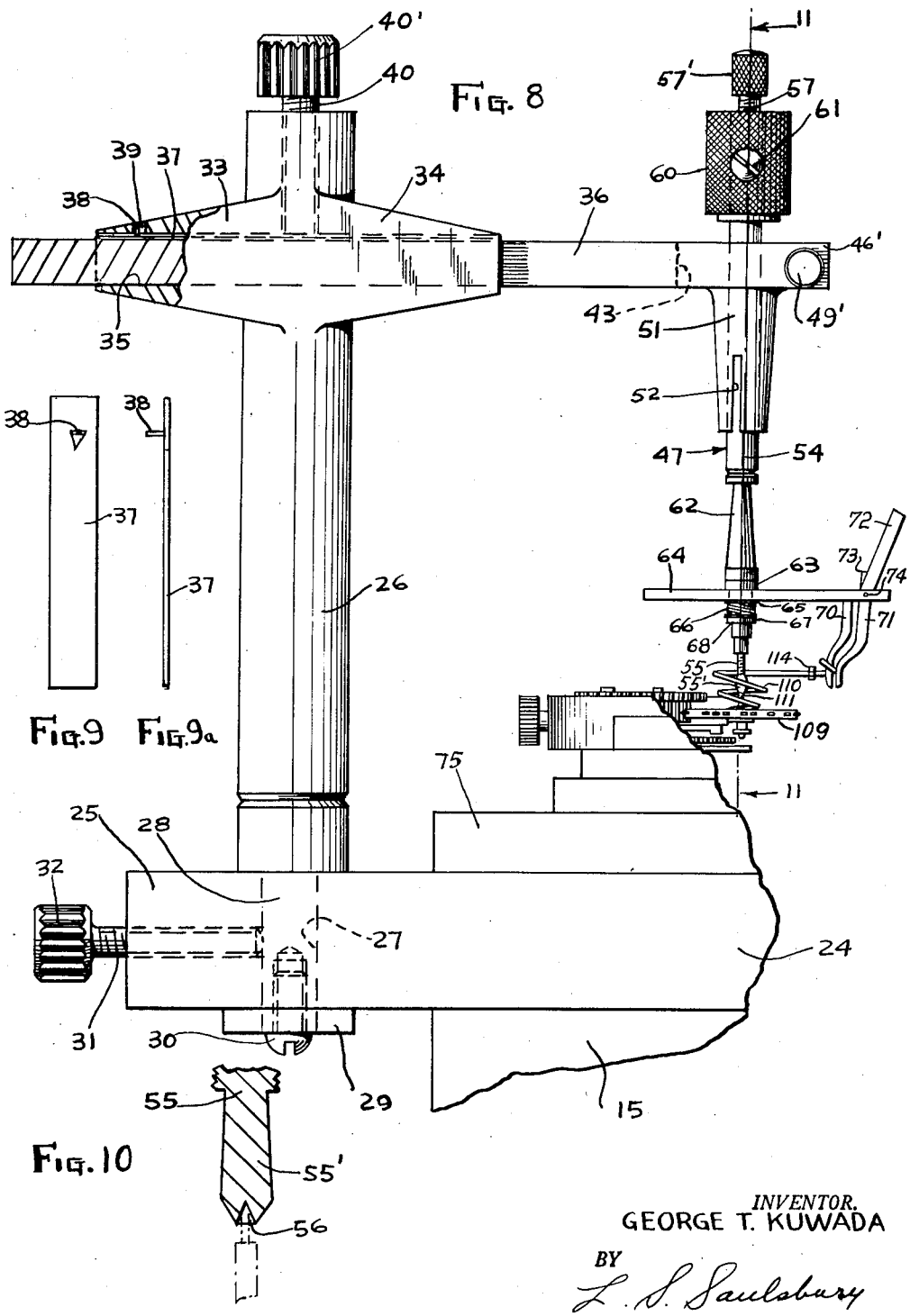

United States Patent Office 2,772,562
Patented Dec. 4, 1956

2,772,562

WATCH BALANCE SPRING TESTING DEVICE

George T. Kuwada, New York, N. Y.

Application October 15, 1953, Serial No. 386,192

8 Claims. (Cl. 73—6)

This invention relates to a watch balancing spring testing device.

It is among the objects of the present invention to provide a testing device adapted to receive and retain a watch and to determine the critical length of the watch balance spring when being put into the watch, the device being adapted to transmit the sound vibrations to an electric graph recording device that will give indication when the proper length of the balance spring has been attained and to make unnecessary the complete installation of the balance spring to test the watch and the making of later adjustments.

It is another object of the invention to provide a balance spring testing device that facilitates the installation of the balance spring within the watch and which has parts adapted to be easily and quickly centered upon the balance wheel pivot and adapted to be easily and effectively positioned to grip the outer free end of the spring.

Other objects of the invention are to provide a balance spring testing and installing device which is of simple construction, inexpensive to manufacture, has a minimum number of parts, makes easy the handling of the balance spring, compact, easy to adjust, of pleasing appearance, convenient to use and efficient in operation.

For other objects and a better understanding of the invention, reference may be had to the following detailed description taken in connection with the accompanying drawing, in which:

Figure 1 is a perspective view of the balance spring testing device embodying the features of the present invention;

Fig. 2 is a perspective view of the electric time graph recorder used in connection with the present balance spring testing device;

Fig. 3 is a fragmentary, perspective and collective view of the adjustable horizontally-extending arm and of a vertical sleeve bushing which is connected to the underside thereof and through which vertical adjustment of the center pin assembly is effected;

Fig. 4 is an enlarged top plan view of the sound box and slidable jaws for affixing the watch thereto with the vertical post support and horizontally extending arm removed therefrom;

Fig. 5 is a top plan view of the slidable jaws adapted for and closed upon a large size watch;

Fig. 6 is a top plan view of the slidable jaws reversed upon their supports and retaining a small size watch;

Fig. 7 is an enlarged vertical elevational view of the balance spring testing device with a portion of the same broken away and shown in section generally on line 7—7 of Fig. 4;

Fig. 8 is a fragmentary and enlarged elevational view of the device showing the vertical post support, the horizontally extending arm and the center pin assembly in place upon a watch balance wheel shaft and gripping a balance spring end;

Figs. 9 and 9a are respectively front and side edge elevational views of a wear plate for the horizontally extending center pin assembly arm which is mounted in the elongated opening of the vertical support;

Fig. 10 is an enlarged fragmentary and sectional view of the lower end of the center pin that engages the upper end of the balance wheel shaft;

Fig. 11 is a vertical sectional view of the center-pin assembly as viewed on line 11—11 of Fig. 8;

Fig. 12 is a collective and perspective view of one of the watch retaining jaw assemblies.

Referring now to the figures, 15 represents a round hollow metal sound box or base having a sound transmitter 17 therein, that may consist of appropriate crystals and a condenser, and from which a cable 18 extends to a time graph recording device 19, shown in Fig. 2, that is a measuring instrument and is not a part of the invention. This cable 18 has a jack plug 20 that extends into an opening 21 in the graph recording device 19. A graph strip 22 is projected from the device 19, and from which a reading of the vibrations or ticks of the watch are taken. These vibrations are indicated at 23 and when they conform to a center line pattern having symmetry, the watch may be said to be properly regulated.

On the top of the sound box 15 is a large flange formation 24 of thick metal which has a laterally extending projection 25 that supports for rotation a vertical post support 26. The projection 25 has a vertically extending opening 27 therein, Fig. 8, through which a depending reduced diameter portion 28 of the post 26 extends. A retaining washer 29 is fixed to the lower end of the projection 28 by a screw 30 to prevent the upward displacement of the post support 26. A retaining set screw 31 extends into the end of the projection 25 and will engage the reduced diameter portion 28 to hold the post against rotation upon the projection 25. This set screw 31 has a serrated handle knob 32.

On the upper end of the post 26 are laterally extending hollow projections 33 and 34 extending from the opposite sides of the post and combined with one another and with an opening in the post to provide an elongated square opening 35 through which horizontally extending slide arm 36 can be adjusted. A wear plate 37, Figs. 8, 9 and 9a, having a struck projection 38 rests upon the upper side of the slide arm 36 within the opening 35. The struck projection 38 enters an opening 39 in the projection 33 so as to retain the plate 37 against lateral displacement through the opening 35. A set screw 40 having a serrated handle 40′, Fig. 8, is adjustable in the upper end of the post 26 and engages with the wear plate 37 to hold the same in tight clamping engagement with the top face of the slide arm 36 and the slide arm against horizontal adjustment in the opening 35.

The slide arm 36 is slit on its outer end as indicated at 43, Fig. 3, and the inner end of the slit has an enlarged hole 44 with a transverse slit 45 extending laterally therefrom. This provides sufficient weakness so that a portion 46 at one side of the slit 43 can be slightly separated from an opposite relatively rigid side portion 46′ to accommodate and permit sliding movement of a centering pin assembly indicated generally at 47. Intermediate the length of the slit 43 is a large round opening 48 to accommodate the centering pin assembly 47. A set screw 49 which has a knob 49′, is threaded into the portion 46 and extends through the opposite side portion 46′ of the slit 43 and can be tightened to hold the center pin assembly 47 in its vertically adjusted position and loosened to release the assembly 47 for adjustment.

Fixed to the bottom side of the slide arm 35 and to the rigid side portion 46′ is a sleeve bushing or guide 51 slotted on two sides as indicated at 52, Fig. 8, to provide some relief to the movement of the center pin assembly 47 therethrough. The upper end of the sleeve 51 is secured only to the weakened portion 46′ of the slide arm 36 as indicated by area 53 in Fig. 3. The other half of the upper end face of the sleeve is not connected to the weakened portion 46, so that movement of the weakened portion 46 can be effected without interference of the bushing 51.

The center pin assembly 47 comprises a vertically extending tubular shaft 54 having a central hole 54' extending therethrough, Figs. 8 and 11. This hole 54' runs throughout the extent of the shaft 54 and is enlarged at 54" and accommodates a threaded centering pin 55 having a tapered lower head 55' recessed at its lower end as indicated at 56, Fig. 10, to receiver the end of the shaft of a watch balance wheel. The upper end of the adjustable centering pin 55 is enlarged and threaded at 57 and has a knurled knob 57' that extends above the upper end of the shaft 54. An internally threaded bushing 59 is fitted in the enlarged part 54" of the opening 54', and the enlarged part 57 of the shaft 55 is adjustable therein to move the shaft head 55' toward and away from a watch balance wheel shaft in a manner to be later described. A knob 60 is fixed upon the upper end of the tubular shaft 54 by a set screw 61, Fig. 8. This knob serves as a handle by which the assembly 47 may be adjusted in the end of the arm 36 when the screw 49 is loosened. The lower end of the shaft is relieved as indicated at 62 and has a shoulder 63 against which a laterally adjustable slotted arm 64 is retained by engagement of a washer 65 bearing against the underside of the slotted arm 64, a compression spring 66, a washer 67 and a friction fitted stop collar 68. A bushing 69 is provided on the shaft 54 to accommodate the washers and spring, Fig. 11.

On one end of the slotted arm 64 is fixed a depending jaw finger 70 that is inwardly offset on its engaging end and cooperating therewith is a pivotable jaw finger 71 having a handle extension 72. The pivotable jaw 71 also has an inwardly offset engaging end that is urged against the engaging end of the fixed jaw 70 by a spring 73 on pivot pin 74 that connects the jaw 71 to the arm 64. The jaw fingers grip one end of the watch balance spring in a manner later to be described.

On the large flange 24 of the sound box 15 is a round top plate 75 which is secured to the top of the ring by screws 75'. Within the base 15 is an inner sound box 76 that is connected to and suspended from the underside of the plate 75. This box 76 is of rectangular shape and has side walls 76' and end walls 76" and a bottom plate 77 secured to the walls by fastening screws 78. The transmitter 17 is fixed by a depending post 17' to the bottom plate 77. The top plate 75 has a rectangular shaped opening 79 over which the watch works are placed.

Within the sound box 76 are two slides 80 and 81 that are movable longitudinally of the box 76. Extending from opposite sides of the flange 24 and through the respective ends of the box 76 are respectively adjusting screws 82 and 83. These adjusting screws are respectively threadedly engaged with and extend through the respective slides 80 and 81. The slides 80 and 81 are threaded and accordingly as the screws 82 and 83 are turned, these slides will be adjusted toward or away from each other. These screws respectively have serrated knobs 82' and 83' by which they are turned. Each of these adjusting screws is journalled in smooth openings in the ring flange 24 and in the box end 76", so as to permit easy rotation of each of the screws. Each screw 82 and 83 is held against axial displacement from the end wall 76" of the box 76 and flange 24 by a washer 87 and a cotter pin 88, Fig. 7. Since these slides 80 and 81 are threaded, rotation of the screw causes the movement of the slide.

The adjusting screw 83 has a small hole 89 in the inner end thereof, and the screw 82 has a small projection 90 which is journalled in the hole 89. The pin projection 90 supports a washer 91 that serves as a stop to limit the inward movement of the slide and to prevent the same from becoming disengaged from the adjusting screw or transferred to the other screw. The slides will come to a stop upon engagement with the washer 91.

Attached to the respective slides 80 and 81 are respectively jaw assemblies 93 and 94 by which a watch works is retained. The jaw 93, and similarly the jaw 94, is constructed in a manner to be presently described. Each jaw comprises a base plate 96 on the bottom of which is a guide block 97, Fig. 12, downwardly from which there extends laterally spaced prongs 98 adapted to engage with spaced openings in the slide and lying respectively at opposite sides of the threaded opening of the slide 80 or 81, and an elongated opening 79 in plate 75. The base plates 96 are held against upward displacement from the top plate 75 by opposed parallel guide members 99 and 100 made secure to the plate 75 by screw rivets 101. The jaw base plate 96 has pairs of spaced screw holes 96' into which screws 102 fit to secure a jaw plate 103 to the base plate 96. The jaw plate 103 has small diameter steps 104 for receiving a small size watch 105, Figs. 4 and 6, and large diameter steps 106 for receiving a large size watch 107, Fig. 5. There are two pairs of holes 96' in the plate 96 to receive the screws 102 and accordingly the jaw plate 103 can be secured to the base 96 at either of two positions. Also, the jaw plate 103 is removable and can be turned around to locate either of the steps 104 or 106 inwardly depending upon the size of the watch to be retained.

Each of the watches has a balance wheel 109, as shown more clearly in Fig. 8, and to this balance wheel is attached a spring 110, the length of which must be predetermined for the proper operation and timing of the watch. It is desired to adjust the end of the spring through a stud or a post in the watch until the proper timing adjustment of the watch has been effected.

In use, the watch works 105 or 107 with the balance bridge removed is placed between the slide jaw assemblies 93 and 94, the jaw plates 103 having been adapted according to the size of the watch to be tested, and thereupon the adjusting screws 82 and 83 are tightened so that the watch works will be clamped between the jaw assemblies in a tight manner. The upper end of a balance wheel shaft 111, Fig. 8, will lie under the head 55' of the adjustable center pin 55 and within the recess 56 thereof, Fig. 10. The pin 55 is adjusted so as to provide a rotational grip upon the end of the shaft 111 and permit rotation of the balance wheel by the escapement. The arm 64 will be swung to a position according to the diameter of the spring, and the free end of balance spring wire is brought between the finger projections on the arm 64. The end of the spring is thus disposed between the fingers 70 and 71 and is longitudinally adjusted therebetween until the proper reading is noted upon the tape 22 of the time graph recording device instrument 19, as shown in Fig. 2. The spring is then cut at the measured length and is drawn through stud clamp 114 on the watch Fig. 8 to the proper location, the stud screw will be made tight, and the balance spring will have been properly adjusted for the watch and without any trial or error procedure requiring the complete assembly of the watch each time this test is effected.

The arm 64 is laterally adjustable to the diameter of the different springs and the inwardly offset jaw fingers 70 and 71 can thus be brought in to a point close to the center pin assembly 47 to accommodate a small spring. The arm 64 is also rotatable upon the center pin assembly 47 to adjust the spring end through the stud 114. By release of the set screw 40 the arm 36 can be adjusted in and out to get the measured distance for the location of the pin 55 relative to the post. When the adjustment has been made, the screw 40 can be set against the wear plate 37. The post 26 with the arm 36 can be swung away from the watch works by releasing the screw 31 that engages the projection 28. The washer 29 has frictional engagement with the underface of the projection 25 so that it prevents free swinging movement. When the post has been swung to the proper position, the set screw 31 is tightened.

It should now be apparent that there has been provided a balance spring adjusting and testing device whereby a watch can be quickly and efficiently regulated without requiring the assembling of watch parts to apply the watch to the recording device before it is certain that the proper adjustment has been effected.

While various changes may be made in the detail construction, it will be understood that such changes shall be within the spirit and scope of the present invention, as defined by the appended claims.

What is claimed is:

1. A watch balance spring testing device comprising a sound box structure having a transmitter therein, a post extending up from the side of the sound box, a horizontally extending arm slidably connected to the upper end of said post, a center pin assembly vertically and rotatably adjustable in the free end of the slidable arm, said center pin assembly including a tubular shaft, a center pin threaded in such shaft for adjustment therethrough and having a bearing adapted to receive the end of a balance wheel shaft, an adjustable arm on the lower end of the center pin assembly, said arm having depending finger jaws adapted to grip the free end of a watch balance spring, adjustable opposing jaw members mounted on the top of the sound box structure adapted to receive and retain a watch works, adjustable screws on the sides of the box for adjusting said jaw members toward and away from each other, and a cable extending from the transmitter and adapted to be connected to a device for recording the watch beats.

2. A watch balance spring testing device comprising a sound box structure having a transmitter therein, adjustable jaw members mounted on the top of the sound box structure and adapted to receive and retain a watch works above said sound box structure, adjustable support means disposed above said jaw members, an adjustable member depending from said support means and having a bearing adapted to receive the end of a watch balance wheel shaft of the watch works, laterally adjustable means on said depending member for gripping the free end of a watch balance spring of the watch works and means for connecting said transmitter to a device for recording watch beats.

3. A watch balance spring testing device as defined in claim 2 wherein said sound box structure comprises side members, a top plate provided with an elongated opening, an inner sound box member depending from said top plate below the opening therein, means for connecting the transmitter to said inner sound box member, a pair of opposing slide members longitudinally adjustable in said inner sound box member and adapted to be connected to said opposing jaw member, and means for longitudinally adjusting said slide members.

4. A watch balance spring testing device as defined in claim 2 wherein said opposing jaw members have stepped portions of different contours adapted to receive watches of various sizes and means for adjustably connecting said stepped portions in a plurality of corresponding, selectively opposed positions to said adjustable slide members.

5. A watch balance spring testing device as defined in claim 2 wherein the means for gripping the free end of a watch balance spring comprises a laterally extending arm rotatably and laterally adjustable upon said center pin assembly and jaw finger members depending from the outer end of said laterally extending arm and adapted to grip the free end of a watch balance spring.

6. A watch balance spring testing device as defined in claim 2 wherein said center pin assembly comprises a vertically extending shaft having a central opening extending therethrough and enlarged at the upper end of said shaft, an internally threaded bushing disposed within the enlarged opening in said shaft, a centering pin extending through the openings in said shaft and said bushing, said centering pin having a threaded portion adapted for threaded engagement with said internally threaded bushing, and bearing means engageable with the end of a watch balance wheel shaft, and means for fixing said centering pin assembly in vertically adjusted position.

7. A watch balance spring testing device comprising a large sound box, a flange mounted on the upper end of the sound box and having a laterally extending projection, a vertically extending post rotatably mounted in said laterally extending projection, a set screw for holding the post against rotation, projections on the upper end of said post provided with openings aligned with an opening in the post, a pressure plate extending through the openings, a set screw engageable with the pressure plate and threaded in the upper end of the post, a slide extending under the pressure plate and adapted to be adjusted to different positions outwardly of the post, said slide having its end bifurcated to provide a slit and one side of the end adjacent the slit being weakened, a tapered sleeve secured to the weakened end, and the weakened end being slidable and movable relative to the upper end of said sleeve, a center pin assembly extending downwardly through said arm and said sleeve, a set screw for clamping the center pin assembly in a vertically adjusted position, said center pin assembly including a vertically adjustable screw and having a head end engageable with the end of a balance wheel shaft, a knob member upon said assembly adapted to be gripped to adjust the assembly relative to the end of the arm, a laterally extending arm slidable on the lower end of the assembly, said laterally extending arm having finger jaw members projecting downwardly into a location adjacent the lower end of said center pin screw, said jaw fingers adapted to engage the free end of a balance spring, said laterally extending member being laterally and rotatably adjustable relative to the center pin assembly, compression spring means upon the assembly engaging with the laterally extending arm to retain the same in frictionally tight manner upon the assembly, a top plate provided with an elongated opening and secured to the top of said box, a small sound box connected to said top plate below the opening, slide jaw assemblies, slides movable in the small sound box, adjusting screws extending outwardly of the small sound box for moving said slides, said slide assemblies including jaw members engageable with the sides of a watch.

8. A watch balance spring testing device as defined in claim 2, wherein the means for longitudinally adjusting said slide members consists of at least one pair of adjusting screws axially aligned with one another, each of one of said pair of screws having an opening in the end thereof, the other of each of said pair of screws having a projection adapted to extend into the opening and stop washers disposed on the projection and lying between the ends of the screws and serving to engage the slides and prevent the transfer of one slide from one screw to the opposite screw.

References Cited in the file of this patent

UNITED STATES PATENTS

| | | |
|---|---|---|
| 339,051 | Eisen | Mar. 30, 1886 |
| 406,655 | Logan | July 9, 1889 |
| 2,158,725 | Lawson et al. | May 16, 1939 |
| 2,366,519 | Greenberg | Jan. 2, 1945 |
| 2,476,761 | Olinger | July 19, 1949 |
| 2,571,176 | Acrea | Oct. 16, 1951 |
| 2,584,562 | Dostal | Feb. 5, 1952 |